(12) United States Patent
Küster

(10) Patent No.: US 11,572,860 B2
(45) Date of Patent: Feb. 7, 2023

(54) WIND POWER PLANT

(71) Applicant: FLOWGEN DEVELOPMENT & MANAGEMENT AG, Zug (CH)

(72) Inventor: Dirk Küster, Benglen (CH)

(73) Assignee: FLOWGEN DEVELOPMENT & MANAGEMENT AG, Zug (CH)

(*) Notice: Subject to any disclaimer, the term of this patent is extended or adjusted under 35 U.S.C. 154(b) by 67 days.

(21) Appl. No.: 17/264,884

(22) PCT Filed: Jul. 31, 2018

(86) PCT No.: PCT/EP2018/070647
§ 371 (c)(1),
(2) Date: Feb. 1, 2021

(87) PCT Pub. No.: WO2020/025106
PCT Pub. Date: Feb. 6, 2020

(65) Prior Publication Data
US 2021/0301782 A1    Sep. 30, 2021

(51) Int. Cl.
*F03D 1/04* (2006.01)
*F03D 1/02* (2006.01)
(Continued)

(52) U.S. Cl.
CPC .............. *F03D 1/04* (2013.01); *F03D 1/02* (2013.01); *F03D 9/25* (2016.05); *F03D 80/70* (2016.05);
(Continued)

(58) Field of Classification Search
CPC ... F03D 13/20; F03D 9/25; F03D 3/02; F03D 1/02; F03D 1/04; Y02E 10/72;
(Continued)

(56) References Cited

U.S. PATENT DOCUMENTS 4,021,135 A * 5/1977 Pedersen ............... F03D 1/04
415/908
4,140,433 A * 2/1979 Eckel ..................... F03D 13/10
415/908
(Continued)

FOREIGN PATENT DOCUMENTS

EP     3 473 848 A1    4/2019
WO    2014/136032 A1   9/2014

OTHER PUBLICATIONS

Apr. 30, 2019 Written Opinion issued in International Patent Application No. PCT/EP2018/070647.
(Continued)

*Primary Examiner* — Igor Kershteyn
(74) *Attorney, Agent, or Firm* — Oliff PLC

(57) ABSTRACT

A wind power plant includes a shrouded wind turbine having an annular shroud which defines a longitudinal axis and which is rotationally symmetrical thereto. A radially inner upper side of the shroud forms a flow channel for the wind, wherein a propeller which can rotate about the longitudinal axis and is intended for driving an electrical generator is rotatably mounted in the flow channel. A support, which defines a support longitudinal direction, has arranged thereon an annular shroud bearing element on which the shroud, and hence the wind turbine, can be mounted in different pivoting positions about a pivot axis, which extends transversely with respect to the support longitudinal direction.

13 Claims, 3 Drawing Sheets

Figure 9:
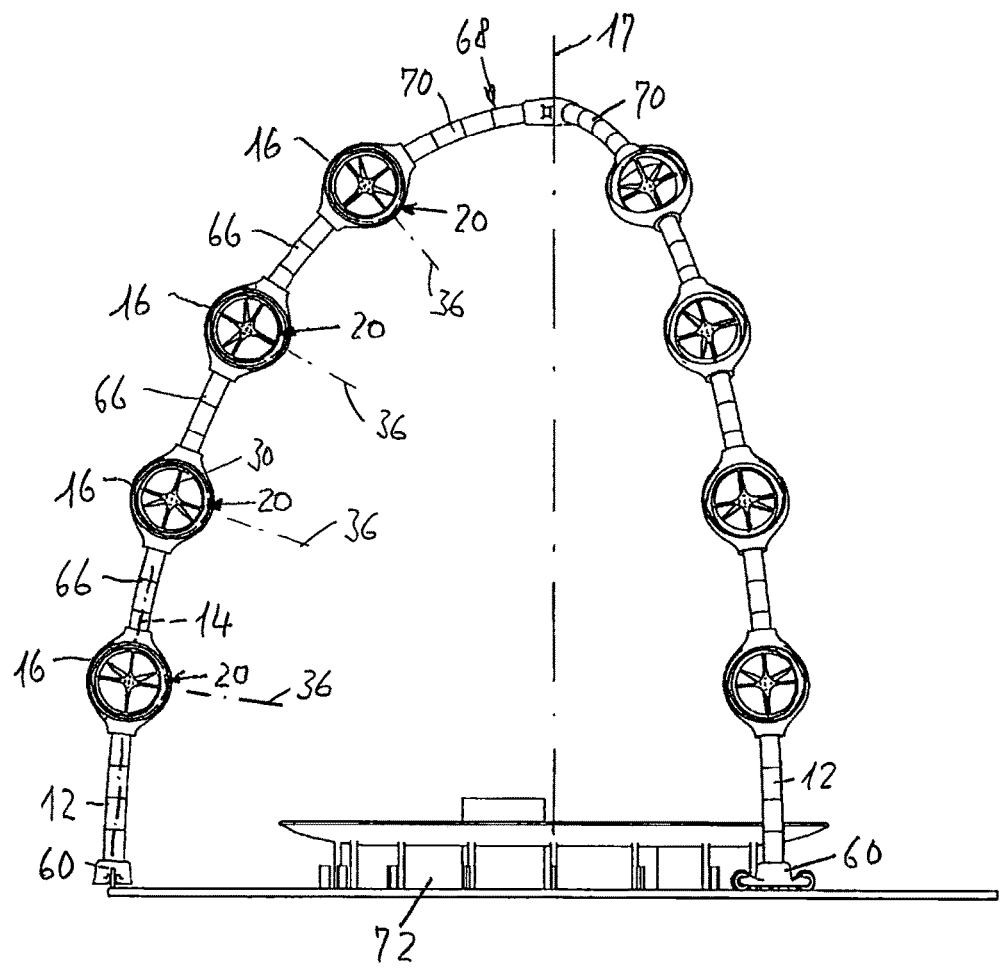

(51) Int. Cl.
    *F03D 9/25*     (2016.01)
    *F03D 80/70*    (2016.01)
(52) U.S. Cl.
    CPC ..... *F05B 2220/706* (2013.01); *F05B 2240/13* (2013.01); *F05B 2240/50* (2013.01); *F05B 2240/94* (2013.01); *F05B 2250/711* (2013.01)
(58) Field of Classification Search
    CPC ... Y02E 10/728; Y02E 7/74; F05B 2220/706; F05B 2240/13; F05B 2240/50; F05B 2240/94; F05B 2250/711
    See application file for complete search history.

(56) References Cited

U.S. PATENT DOCUMENTS

| | | | |
|---|---|---|---|
| 4,720,640 A | 1/1988 | Anderson et al. | |
| 2008/0240916 A1* | 10/2008 | Krouse | F03B 11/02 415/211.2 |
| 2009/0087308 A2* | 4/2009 | Presz | F03D 1/04 415/220 |
| 2010/0068052 A1* | 3/2010 | Werle | F03D 1/04 415/220 |
| 2010/0316487 A1* | 12/2010 | Presz, Jr. | H02S 10/12 415/121.3 |
| 2011/0008164 A1* | 1/2011 | Presz, Jr. | F03D 1/04 415/211.2 |
| 2011/0140454 A1 | 6/2011 | Earl | |
| 2013/0266429 A1 | 10/2013 | Andrews | |
| 2013/0313827 A1* | 11/2013 | Lovmand | F03D 7/0264 290/44 |
| 2021/0301782 A1* | 9/2021 | Küster | F03D 13/20 |

OTHER PUBLICATIONS

Apr. 30, 2019 International Search Report issued in International Patent Application No. PCT/EP2018/070647.

* cited by examiner

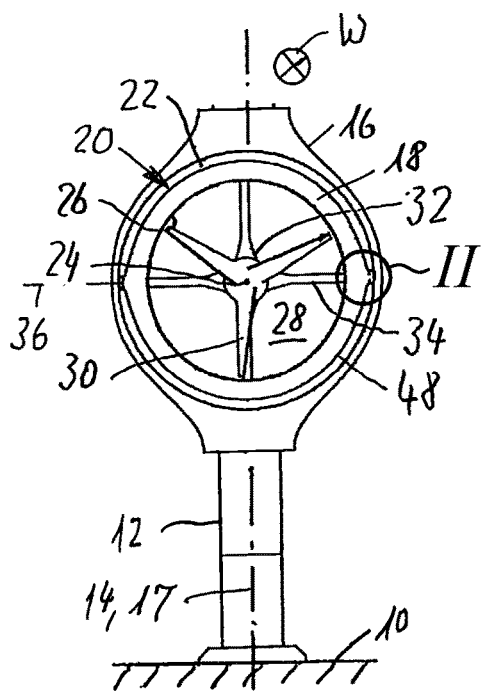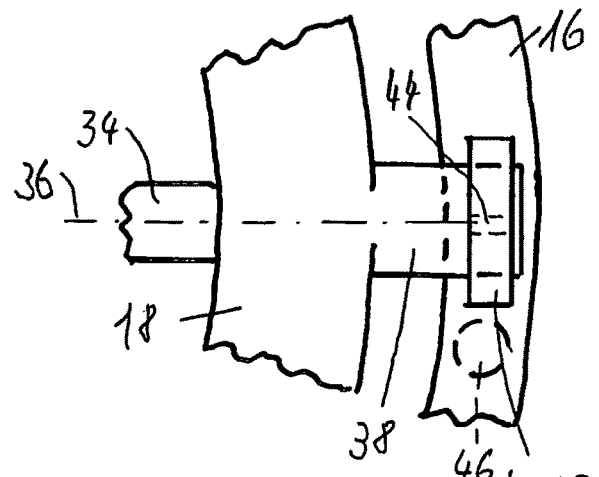
FIG. 1
FIG. 2
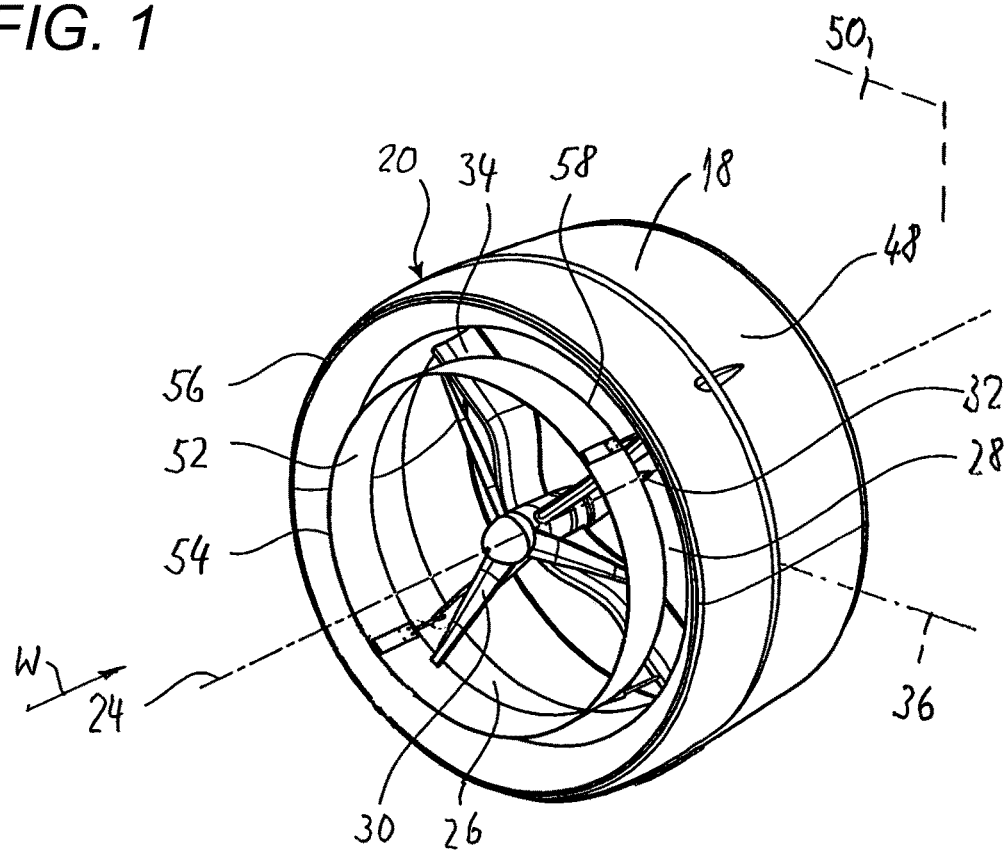
FIG. 3

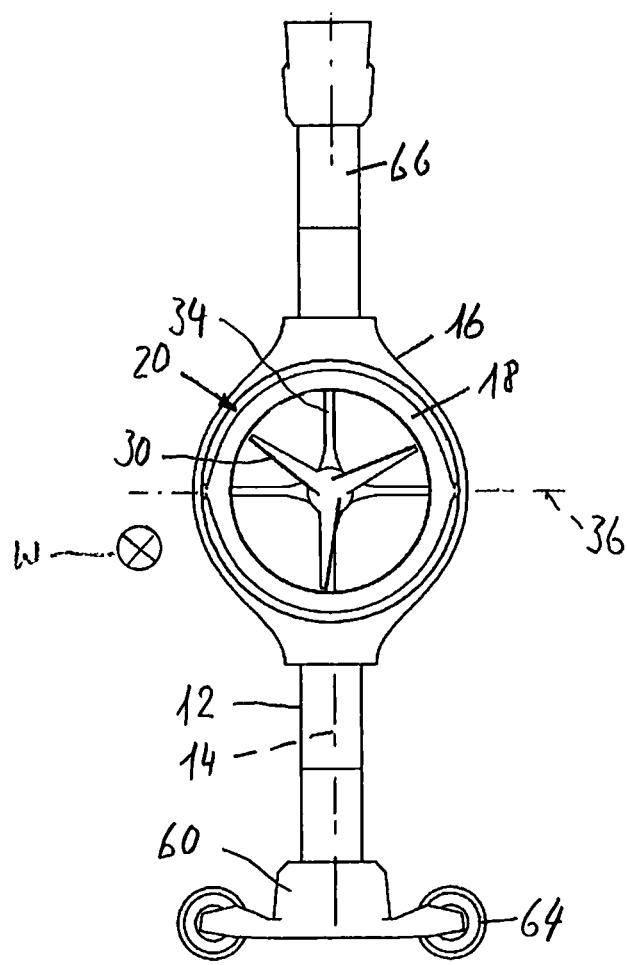
FIG. 4
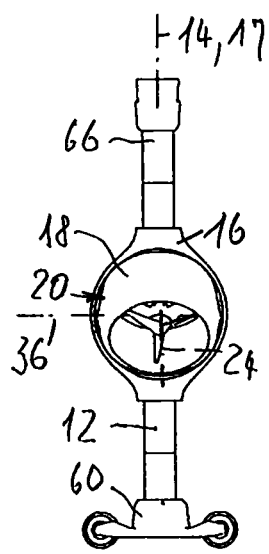 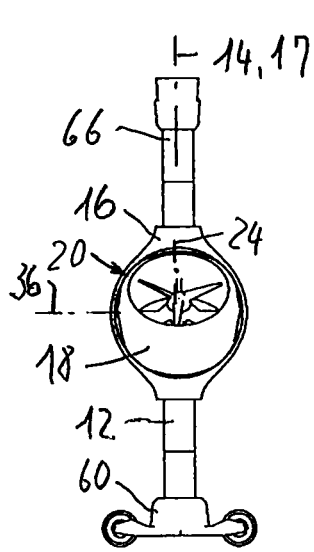 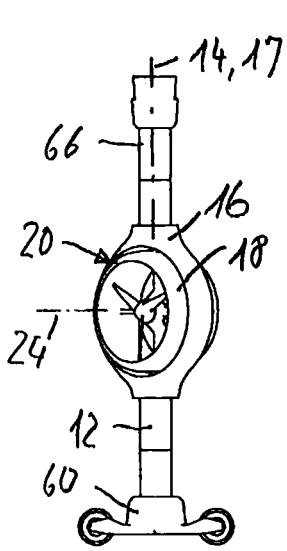 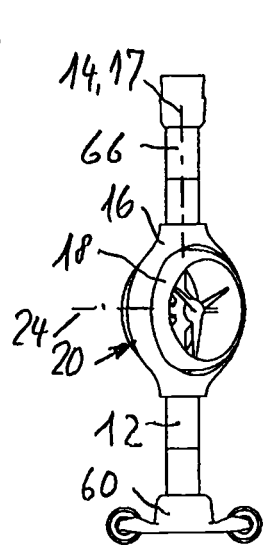
FIG. 5  FIG. 6  FIG. 7  FIG. 8

WIND POWER PLANT

The invention relates to a wind power plant according to claim 1.

Wind power plants with shrouded wind turbines are generally known. Usually, the shrouded wind turbine is arranged on a support defining a support longitudinal direction, for example a tower or a framework, in a rotatable manner about the support longitudinal direction by means of a shroud bearing element. This allows the shrouded wind turbine to rotate around the support longitudinal direction in the respective wind direction, so that the propeller is optimally exposed to the wind to drive an electric generator.

A wind power plant with a particularly effective shrouded wind turbine is disclosed in the prior patent application EP 17 197 490.0.

It is an object of the present invention to provide a wind power plant with a shrouded wind turbine, which is optimally adaptable to wind and conditions on site with a simple construction.

This object is achieved with a wind power plant according to claim 1.

Preferred embodiments of the wind power plant are given in the dependent claims.

The shrouded wind turbine of the wind power plant has a ring-shaped shroud defining a longitudinal axis, which is at least approximately rotationally symmetrical to the axis, and which radially inner upper side delimits a flow channel for the wind. A propeller which can be rotated around the longitudinal axis is arranged in the flow channel and drives an electric generator. The generator is preferably arranged downstream of the propeller in the direction of the wind flow, wherein the shaft of the generator is preferably arranged concentrically to the longitudinal axis.

The wind power plant also has a support, which defines a support longitudinal direction, wherein a shroud bearing element is arranged on the support. The shroud of the wind turbine and thus the entire wind turbine can be mounted on the shroud bearing element in different pivoting positions about a pivot axis running transversely to the support longitudinal direction.

The wind power plant according to the invention makes it possible to arrange a single shrouded wind turbine or several shrouded wind turbines on a support, the support longitudinal direction of which can deviate from the vertical or which has a bend instead of a straight longitudinal direction. Furthermore, the wind power plant according to the invention enables the shrouded wind turbine to be optimally oriented into the wind even in mountainous terrain, for example, where the wind does not always blow in a horizontal direction. The pivoting position is selected accordingly.

Preferably, the pivot axis runs at least approximately at right angles to the support longitudinal direction. This enables a simple construction of the wind power plant.

Preferably, the shroud bearing element is of a closed, at least approximately circular design, wherein it preferably surrounds the shroud of the wind turbine at a distance. On the one hand, this ensures a very stable construction and on the other hand, the annularly designed shroud bearing element offers the possibility, especially on the side facing away from the support, to arrange a support extension on the shroud bearing element, which support extension carries a preferably identically designed further shroud bearing element, on which a preferably identically designed further shrouded wind turbine is arranged.

However, it is also conceivable to design the shroud bearing element at least approximately in the shape of a semicircular ring or with two profiled supports, in which case the pivot axis preferably runs through the two end regions of the shroud bearing element. For the sake of completeness, it should be mentioned that it is also possible to arrange a support extension on the shroud bearing element, which in turn supports another shroud bearing element on which a further shrouded wind turbine is arranged.

Preferably, the shroud, and thus the shrouded wind turbine, is pivotally mounted on the shroud bearing element. This enables an exact alignment of the pivoting position to the wind conditions.

Preferably, bearing stubs protrude from the shroud on both sides radially towards the outside and concentrically to the pivot axis, which are held in bearing elements of the shroud bearing element. This enables a simple construction of the shrouded wind turbine and in particular its shroud. Of course, the kinematic reverse is also possible, i.e. the bearing stubs are fixed to the shroud bearing element and the bearing elements are arranged on or in the shroud.

Preferably, the bearing elements are designed as pivot bearings. It is possible to fix the pivoting position by means of a locking device, for example by designing the pivot bearing as a clamp bearing. However, it is also possible to provide a pivot drive to pivot the bearing stubs, which are freely rotatable in the pivot bearing, and thus the shroud and the entire shrouded wind turbine about the pivot axis. The first mentioned possibility allows a simple construction, and the second possibility allows an optimal adaptation to different wind conditions.

Preferably, the shroud bearing element can be mounted on the support about the support longitudinal direction at the shroud bearing element in different rotational positions. This makes it possible to use the same components even if the support longitudinal direction deviates from the vertical or is curved.

Preferably, the shroud bearing element is arranged on the support so that it can rotate about the support longitudinal direction; the support longitudinal direction for the shroud bearing element then forms the axis of rotation. This enables a kind of gimbal suspension of the shroud and thus of the shrouded wind turbine, wherein it can be optimally and easily adapted to all wind conditions, for example also to downdrafts.

Preferably, the shroud bearing element is fixed to the support, wherein the support can be rotated about an axis of rotation; the axis of rotation can coincide with the support longitudinal direction. With this embodiment also, the direction of the longitudinal axis of the shrouded wind turbine can be optimally adapted to the wind conditions.

The wind power plant according to the invention also offers the possibility that at least two supports connected to each other in a portal-like manner, which are each equipped with at least one shroud bearing element supporting a shrouded wind turbine, can be rotated about an axis of rotation. In this case, the axis of rotation is preferably located at least approximately centrally between the supports and runs at least approximately in a vertical direction. Preferably, three supports are connected to each other in a portal-like manner. The portal-like connection is preferably formed by portal extensions, which are preferably attached to the respective uppermost shroud support element on the side facing away from the respective support. In this way, it is possible to operate several shrouded wind turbines in a small space with a simple and stable construction.

The possibility of attaching the shroud bearing elements to the supports and, if necessary, to support extensions in different rotational positions as well as the shrouds of the shrouded wind turbines in different pivoting positions to the shroud bearing elements made it possible to align all shrouded wind turbines parallel to each other in a simple way.

Preferably, the supports are arranged on rolling feet. In this case, the track or rail on which the rolling feet roll runs circularly and centrically to the axis of rotation. This enables the common alignment of all shrouded wind turbines in the wind direction.

Preferably, the shroud of the shrouded wind turbine has the cross-section of a biconvex wing profile. In this case, the radially outer underside of the shroud preferably has at least approximately the shape of the shroud of a spherical layer, which is preferably at least approximately symmetrical to a plane of symmetry running at right angles to the longitudinal axis, in which the pivot axis lies. This embodiment enables an obstacle-free arrangement of the shrouded wind turbine in different pivoting positions.

Preferably, the wind power plant comprises a wind turbine or several wind turbines as disclosed in the application EP 17 197 490.0. The disclosure of this European application is incorporated by reference in the present application.

Accordingly, the wind turbine preferably further comprises an annular guide element which is at least approximately rotationally symmetrical with respect to the longitudinal axis, which largest outer diameter is smaller than the smallest clear width of the flow channel, which guide profile nose is arranged upstream with respect to the profile nose of the shroud in the direction of flow of the wind, and which guide element profile trailing edge is arranged downstream with respect to the profile nose and upstream with respect to the smallest clear width of the flow channel. The propeller is located, viewed in the direction of flow, at least approximately at the guide element profile trailing edge. This embodiment of the wind turbine leads to a very good efficiency.

Preferably, the propeller has a diameter which corresponds at least approximately to the clear width of the guide element. Due to this measure, the propeller is only acted upon by the main wind stream flowing through the guide element, while the shroud stream flowing between the guide element and the shroud leads to a negative pressure downstream of the propeller, which contributes to a very good efficiency of the wind turbine.

Preferably, the pivot axis intersects the longitudinal axis and preferably the pivot axis passes at least approximately through the centre of gravity of the shrouded wind turbine.

The propeller preferably has a diameter between 2.5 m and 6 m. With a propeller diameter of 3.0 m, the length of the shrouded wind turbine measured in the direction of the longitudinal axis can be, for example, 2.4 m and the length of the shroud can be, for example, 2.2 m. Correspondingly, the outer diameter of the shroud may be 4.4 m and the outer diameter of the guide element may be 3.1 m. However, the shrouded wind turbine can be made larger or smaller with respect to these dimensions.

The diameter of the propeller is understood to be twice the radius of a blade (from the longitudinal axis to the radially outer end of the blade) in the case of a propeller with an odd number of blades.

Figure 10:
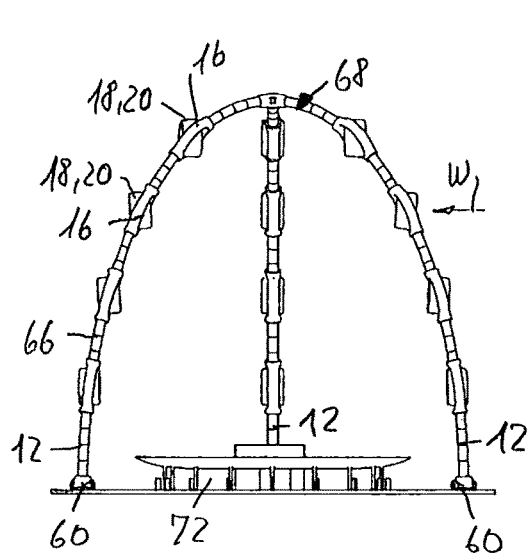
Figure 11:
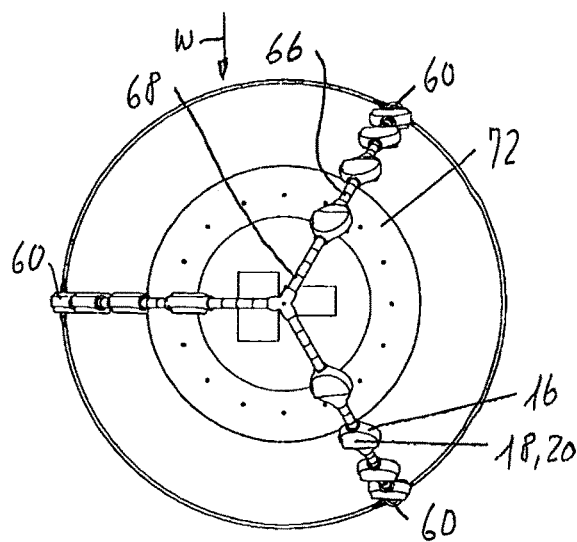

The invention is explained in more detail with reference to examples of embodiments shown in the drawings. They show purely schematically:

FIG. 1 in elevation, a wind power plant with a support standing in the vertical direction on a foundation and a shroud bearing element arranged at the upper end of the support, on which a shrouded wind turbine with its shroud is arranged so as to be pivotable about a pivot axis running in the horizontal direction;

FIG. 2 compared to FIG. 1, an enlarged section of the wind power plant marked II in FIG. 1;

FIG. 3 a perspective view of a preferred embodiment of the shrouded wind turbine;

FIG. 4 in elevation, a part of a wind power plant in which the support is arranged on a rolling foot and carries a circular shroud bearing element on which a shrouded wind turbine is mounted so as to be pivotable about a pivot axis running in the horizontal direction, wherein a support extension is fastened to the shroud bearing element, which support extension in turn is intended to carry a similarly designed shroud bearing element on which a further wind turbine is arranged so as to be pivotable about its pivot axis running in the horizontal direction;

FIG. 5 in the same illustration as FIG. 4, but reduced in size, the part of the wind power plant shown there with a shrouded wind turbine pivoted downwards about the pivot axis;

FIG. 6 in the same illustration as FIG. 5, the wind power plant with the shrouded wind turbine pivoted upwards about the pivot axis, FIG. 7 in the same illustration as FIG. 5 and FIG. 6, the wind power plant with the shroud bearing element rotated clockwise about the support longitudinal direction with the shrouded wind turbine;

FIG. 8 in the same illustration as FIG. 7, the wind power plant with the shroud bearing element rotated counterclockwise in relation to FIGS. 5 and 6 around the support longitudinal direction with the shrouded wind turbine;

FIG. 9 in elevation, a wind power plant with three supports, each arranged on a rolling foot, support extensions and four shroud bearing elements arranged one above the other in the longitudinal direction of the shroud, each with a shrouded wind turbine, wherein the three supports are connected to each other in a portal-like manner;

FIG. 10 in side view and reduced in size compared to FIG. 9, the embodiment of the wind power plant shown there; and FIG. 11 in view from above, the wind power plant embodiment shown in FIG. 9 and FIG. 10.

The embodiment of the wind power plant shown in FIG. 1 has a tubular, rectilinear support 12 mounted on a foundation 10, which support 12 thus defines a support longitudinal direction 14 running in the vertical direction. On the upper end of the support 12 sits a circular shroud bearing element 16 having the form of a closed loop. The shroud bearing element 16 is rotatably mounted on the support 12 about an axis of rotation 17 coinciding with the support longitudinal direction 14.

By way of its circular ring shape, the shroud bearing element 16 defines an axis which runs at right angles to the support longitudinal direction; it is thus arranged standing on the support 12.

The shroud bearing element 16 comprises the shroud 18 of a shrouded wind turbine 20, wherein an air gap 22 is provided between the shroud 18 and the shroud bearing element 16. The shroud 18 defines a longitudinal axis 24, with respect to which it is rotationally symmetrical and formed in a closed loop design. The radially inner upper side 26 of the shroud 18 defines a flow channel 28 in which a three-bladed propeller 30 is arranged. This propeller is acted upon by the wind flowing through the flow channel 28 in the direction of flow W, wherein it is set in rotation about the longitudinal axis 24 and sets in rotation a generator 32 arranged coaxially and downstream for generating electrical energy.

The generator 32 and the shaft of the propeller 30 are supported on the shroud 18 by generator supports 34 arranged in the form of a cross. The shroud 18 preferably has a biconvex wing profile to increase the speed of the wind in the flow channel 28 and to avoid turbulence as far as possible.

The shroud 18, and thus the shrouded wind turbine 20, is mounted on the shroud bearing element 16 to be pivotable about a pivot axis 36, which, in the embodiment shown, extends horizontally and thus at right angles to the support longitudinal direction 14.

For this purpose, as shown in FIG. 2, bearing stubs 38 attached to the shroud 18 protrude radially outwards on both sides and concentrically to the pivot axis 36 from the shroud 18, which bearing stubs 38 are accommodated in bearing elements 42 designed as pivot bearings 40 in the shroud bearing element 16.

In the embodiment shown, the pivot bearings 40 are at the same time designed as clamping bearings to form a locking device 44 when the shroud 18 is in a fixed pivoted position and to hold the shroud 18 and thus the shrouded wind turbine 20 in this pivoted position.

However, it is also possible, as shown by the dashed lines in FIG. 2, to provide a pivot drive 46 in the shroud bearing element 16 to rotate the bearing stubs 38, which are freely rotatably mounted on the pivot bearings 40, and thus to rotate the shrouded wind turbine 20 about the pivot axis 36 into the desired pivoting position and hold it there.

Preferably, the pivot axis 36 runs through the centre of gravity of the shrouded wind turbine 20.

The shrouded wind turbine 20 can thus be aligned in a cardanic manner both about the axis of rotation 17 running in the vertical direction and about the pivot axis 36 running in the horizontal direction against the direction of flow W of the wind to allow the propeller 30 to be optimally acted upon by the wind.

This type of suspension of the shrouded wind turbine 20 also allows the shrouded wind turbine 20 to be optimally aligned in locations where the wind does not blow or does not always blow in a horizontal direction. It is also possible to fix the shroud bearing element 16 to the support 12 and to rotate it together with the support 12 relative to the foundation 10 about the axis of rotation 17.

It is also conceivable to arrange the shroud bearing element 16 in a fixed position with respect to the foundation 10; for example, this is the case for wind power plants arranged in relatively narrow valleys in which the wind practically always blows in the same direction.

FIG. 3 shows a perspective view of a further preferred embodiment of the shrouded wind turbine 20 for the wind power plant. This embodiment of the shrouded wind turbine 20 is described and shown in detail in application EP 17 197 490.0; the disclosure of that EP application is incorporated herein by reference.

The shroud 18 of the shrouded wind turbine 20 shown in FIG. 3 is of closed annular shape and is rotationally symmetrical with respect to the longitudinal axis 24. The cross-section of the shroud 18 has a biconvex shape, with the radially inner upper side 26 defining the flow channel 28. The radially outer lower side 48 of the shroud 18 of the shrouded wind turbine 20 according to FIG. 3 as well as the embodiment according to FIGS. 1 and 2 preferably has the shape of the surface of a spherical layer, wherein said radially outer lower side 48 is symmetrical to a symmetry plane 50 running at right angles to the longitudinal axis 24, in which the pivot axis 36 lies.

The bearing stubs 38, which are not shown in FIG. 3, project radially outwards from the shroud 18 on both sides and are concentric with the pivot axis 36. The shrouded wind turbine according to FIG. 3 also has an annular, closed-loop designed guide element 52, which is rotationally symmetrical to the longitudinal axis 24 and which largest outer diameter is smaller than the smallest clear width of the flow channel 28 and which guide profile nose 54 is arranged upstream with respect to the profile nose 56 of the shroud 18, as seen in the direction of flow W of the wind. The guide element profile trailing edge 58 of the guide element 52 is arranged downstream with respect to the profile nose 56 and upstream with respect to the smallest clear width of the flow channel 28. The propeller, which is rotatable about the longitudinal axis 24, is located, as seen in the direction of flow W, at least approximately at the guide element profile trailing edge 58. The diameter of the propeller 30 preferably corresponds at least approximately to the clear width of the guide element 52. Preferably, the diameter of the propeller 30 is (slightly) smaller than the diameter of the guide element 52 and the radially outer ends of the blades of the propeller 30 are located (slightly) upstream of the guide element profile trailing edge 58 in the direction of flow W.

The propeller 30 is connected to the generator 32, which is arranged coaxially to the longitudinal axis 24 and is attached to the shroud 18 via the generator support 34.

For the sake of completeness, it should be mentioned that the embodiment of the shrouded wind turbine 20 according to FIG. 3 can take the place of the embodiment of the shrouded wind turbine 20 shown in FIGS. 1 and 2 as well as 4 to 11.

In the embodiment of the wind power plant shown in FIGS. 4 to 8, the support 12, the shroud bearing element 16 and the shrouded wind turbine 20 are of the same design as explained in connection with FIGS. 1 and 2. However, the support 12 is not fixed to a foundation 10 but stands on a rolling foot 60 with two rollers 64 mounted on a chassis 62. The purpose and mode of operation of this embodiment is explained in more detail in connection with FIGS. 9 to 11.

On the side facing away from the support 12, a support extension 66, which is also tubular in shape here, is attached to the shroud bearing element 16. The upper end of the support extension 66 is intended to support a further shroud bearing element 16, on which a further shrouded wind turbine 20, as explained in connection with FIGS. 1 and 2, is accommodated so that it can be brought into the desired pivoting position about its pivot axis 36.

In the embodiment according to FIG. 1 also, the corresponding attachment of a support extension 66 for supporting a further shroud bearing element 16 with a further shrouded wind turbine 20 is possible.

In FIG. 5, the shroud 18 and thus the shrouded wind turbine 20 is shown pivoted about the pivot axis 36 in an obliquely downward direction, in which the longitudinal axis 24 rises, as seen in the flow direction W of the wind. For the pivoted position shown in FIG. 6, the shroud 18 and thus the shrouded wind turbine 20 is in a pivoted position directed obliquely upwards and the longitudinal axis 24, viewed in the direction of flow W of the wind, runs downwards.

As shown in FIGS. 7 and 8, the shroud bearing element 16 is arranged on the support 12 to be rotatable about the support longitudinal direction 14. In FIG. 7, the shroud bearing element 16 and thus the shrouded wind turbine 20, seen in view from above, is rotated clockwise compared to the rotational position according to FIGS. 4, 5 and 6, and in FIG. 8 counterclockwise.

It is possible to provide a rotary drive between the support 12 and the shroud bearing element 16. Preferably, however, especially in connection with the embodiment according to FIGS. 9 to 11, a rotary bearing is provided between the support 12 and the shroud bearing element 16 to set and then fix the desired rotary position. The same applies to the bearing elements 42 to fix the pivoting position of each shrouded wind turbine 20.

FIGS. 9 to 11 show a wind power plant in which three supports 12, each arranged on a rolling foot 60, are connected to each other in a portal-like manner via four shroud bearing elements 16, with a support extension 16 running between each of them. An arm 70 of a three-armed portal support element 70 extends to the uppermost shroud bearing element 16 in each case. The support extension 66 associated with each of the supports 12 and the associated arm 70 of the portal support 86 extend with their longitudinal direction 14 in an associated vertical plane, the three vertical planes being offset by 120° relative to one another.

Through the centre of the portal support 68 runs the vertical axis of rotation 17, around which the wind power plant can rotate by means of the rolling feet 60.

Furthermore, in the embodiment of the wind power plant shown in FIGS. 9 to 12, both the supports 12 and the support extensions 66 as well as the arms 70 of the portal support 68 are curved; for example, the support longitudinal direction 14 and longitudinal direction of the support extensions and the associated arm 70, each running in the respective vertical plane, form the shape of the quarter of a standing ellipse.

All shroud bearing elements 16 and the shrouded wind turbines 20 supported by them are of identical design. As can be seen in particular in FIGS. 10 and 11, thanks to the pivot bearing of the shrouded wind turbines 20 and the pivot bearing of the shroud bearing elements 16, all shrouds 18 and thus all shrouded wind turbines 20 can be aligned in such a way that the longitudinal axes 24 run parallel to each other; in the embodiment shown in the horizontal direction. Furthermore, because of the rotatability of the wind turbine about the vertical axis of rotation 17, all shrouded wind turbines 20 can be rotated together in a simple manner against the direction of flow W of the wind.

Of course, it is also conceivable to connect only two supports with these associated shrouded wind turbines 20 in a portal-like manner. Furthermore, it is also possible to form the supports 12 and, if necessary, support extensions 66 in a straight line and in line one above the other and to provide a portal support element running for example in a horizontal direction, on which in turn shroud bearing elements 16 can be provided, each with a shrouded wind turbine 20.

For the sake of completeness, it should be mentioned that the electrical lines from and to the generators 32 run through one of the bearing stubs 38, the shroud bearing elements 16, if present the support extensions 66 and the supports 12 to an electrical forming device and, if applicable, storage device arranged, for example in a building 72.

The invention claimed is:

1. A wind power plant including:
    a shrouded wind turbine including:
        an annular shroud defining a longitudinal axis and being approximately rotationally symmetrical to the longitudinal axis, a radially inner upper side of the annular shroud delimiting a flow channel for the wind, and
        a propeller configured to be impelled by the wind, the propeller being arranged in the flow channel and being rotatable about the longitudinal axis for driving an electric generator,
    a support defining a support longitudinal direction, and
    a shroud bearing element arranged on the support, wherein:
    the annular shroud of the shrouded wind turbine can be mounted on the shroud bearing element in different pivoting positions about a pivot axis extending transversely to the support longitudinal direction,
    a support extension is arranged on the shroud bearing element on a side facing away from the support, and
    the support extension carries a further shroud bearing element on which a further shrouded wind turbine is arranged.

2. The wind power plant according to claim 1, wherein the pivot axis extends approximately at right angles to the support longitudinal direction.

3. The wind power plant according to claim 1, wherein the shroud bearing element is approximately annular and surrounds the annular shroud of the shrouded wind turbine, at a distance.

4. The wind power plant according to claim 1, wherein the annular shroud is pivotably arranged on the shroud bearing element.

5. The wind power plant according to claim 1, wherein bearing stubs project radially outwards from the annular shroud on both sides and concentrically to the pivot axis, and the bearing stubs are held in bearing elements of the shroud bearing element.

6. The wind power plant according to claim 5, wherein the bearing elements are designed as pivot bearings, wherein the wind power plant includes a locking device for fixing the pivoted position or a pivot drive is present for pivoting the annular shroud.

7. The wind power plant according to claim 1, wherein the shroud bearing element can be mounted on the support in different rotational positions about the support longitudinal direction or is arranged rotatably about the support longitudinal direction.

8. The wind power plant according to claim 1, wherein the shroud bearing element is fixedly arranged on the support and the support is rotatable about an axis of rotation.

9. The wind power plant according to claim 8, further comprising at least two supports connected to one another in a portal-like manner, each with at least one shroud bearing element supporting a shrouded wind turbine, wherein the axis of rotation extends approximately centrally between the supports approximately in a vertical direction.

10. The wind power plant according to claim 9, wherein the supports are arranged on roller feet.

11. The wind power plant according to claim 1, wherein the annular shroud of the shrouded wind turbine has a cross-section of a biconvex wing profile, a radially outer underside having approximately a shape of a surface of a spherical layer, and being approximately symmetrical with respect to a plane of symmetry running at right angles to the longitudinal axis, in which the pivot axis lies.

12. The wind power plant according to claim 1, wherein:
    the shrouded wind turbine includes an annular guide element which is approximately rotationally symmetrical with respect to the longitudinal axis,
    a largest outer diameter of the annular guide element is smaller than a smallest clear width of the flow channel, a guide element profile nose of the annular guide element is arranged upstream in a direction of flow of the wind with respect to a profile nose of the annular shroud, a guide element profile trailing edge of the annular guide element is arranged downstream with respect to the profile nose of the annular shroud and upstream with respect to the smallest clear width of the flow channel, and the propeller, as seen in the direction of flow, is located approximately at the guide element profile trailing edge.

13. The wind power plant according to claim 12, wherein the propeller has a diameter which corresponds approximately to the clear width of the guide element.

* * * * *